(12) United States Patent
Zhang

(10) Patent No.: US 10,091,848 B2
(45) Date of Patent: Oct. 2, 2018

(54) CURRENT CONTROL CIRCUIT

(71) Applicant: PRINCETON TECHNOLOGY CORPORATION, New Taipei (TW)

(72) Inventor: Sheng-You Zhang, New Taipei (TW)

(73) Assignee: PRINCETON TECHNOLOGY CORPORATION, New Taipei (TW)

( * ) Notice: Subject to any disclaimer, the term of this patent is extended or adjusted under 35 U.S.C. 154(b) by 20 days.

(21) Appl. No.: 15/227,223

(22) Filed: Aug. 3, 2016

(65) Prior Publication Data

US 2017/0303356 A1  Oct. 19, 2017

(30) Foreign Application Priority Data

Apr. 15, 2016 (CN) .......................... 2016 1 0237713

(51) Int. Cl.
*H05B 33/08* (2006.01)

(52) U.S. Cl.
CPC ..... *H05B 33/0845* (2013.01); *H05B 33/0809* (2013.01); *H05B 33/0887* (2013.01)

(58) Field of Classification Search
CPC ............ H05B 33/0815; H05B 33/0809; H05B 33/0887; H05B 33/0845; H05B 33/0881; H05B 33/0896; H05B 33/0824; H05B 33/0851; H05B 37/02; Y02B 20/347
See application file for complete search history.

(56) References Cited

U.S. PATENT DOCUMENTS

| 7,872,427 | B2 * | 1/2011 | Scianna | H05B 33/0815 315/246 |
| 8,643,297 | B2 * | 2/2014 | Yang | H05B 33/0815 315/219 |
| 8,653,751 | B2 * | 2/2014 | Shimizu | H05B 33/0815 315/299 |
| 9,148,922 | B2 * | 9/2015 | Shteynberg | H05B 33/0815 |

* cited by examiner

*Primary Examiner* — Haissa Philogene
(74) *Attorney, Agent, or Firm* — Muncy, Geissler, Olds & Lowe, P.C.

(57) ABSTRACT

The present invention provides a current control circuit for a driving circuit system of a LED assembly, wherein the driving circuit system includes a current module, a rectifier, and a thyristor, the thyristor is connected in series between an AC power supply and the rectifier, the rectifier rectifies an input AC voltage provided by the thyristor and provides a rectified voltage to an anode of the LED assembly, and an input terminal of the current module and a cathode of the LED assembly are connected to set a current flowing through the LED assembly.

11 Claims, 11 Drawing Sheets

CURRENT CONTROL CIRCUIT

CROSS REFERENCE TO RELATED APPLICATIONS

This application claims priority of China Patent Application No. 201610237713.9, filed on Apr. 15, 2016, the entirety of which is incorporated by reference herein.

BACKGROUND OF THE INVENTION

Field of the Invention

The present invention relates to an electronic circuitry and in particular to a current control circuit of a driving circuit system of an LED assembly.

Description of the Related Art

With the development of the LED lighting, the technology of the LED lighting dimming is also changing. Because many families have gradually become used to being able to dim their lights since the era of the light bulb, thyristor dimming switches are installed in their thyristors to provide dimming control.

In order to make a thyristor perform linear dimming on a driven LED assembly, the thyristor needs to be maintained in a conductive state. That is, in the LED lighting system working state, it is hoped that the working current flowing through the thyristor is always more than the holding current of the thyristor.

FIG. 1 shows a traditional thyristor dimmer driving circuit. As shown in FIG. 1, due to the different holding currents of the various thyristors, the traditional thyristor dimmer driving circuit usually needs to set a larger conductive current of the LED assembly so that the thyristor can maintain a conductive state in order to apply to the maximum variety type of the thyristors. However, a power consumption increases because the conductive current of the LED assembly is set higher.

In addition, according to the conduction principle of the LED assembly, the LED assembly is turned on only when the input voltage is more than the non-inverting conduction voltage of the LED assembly. As a result, in order to turn on the thyristor using the lower voltage, the number of the LED assemblies in the first LED assembly is decreased so that the non-inverting conduction voltage of the first LED assembly becomes smaller. However, when the AC voltage is decreased to less than the non-inverting conduction voltage of the first LED assembly (for example: the non-inverting conduction voltage of the first LED assembly is 60V, and when the AC voltage is decreased to less than 60V), the LED circuit is still turned off, the operating current of the thyristor cannot be maintained (the operating current of the thyristor is less than the holding current of the thyristor), and the thyristor does not work properly, and a flash of the thyristor occurs. The dimming lenity of the thyristor is also influenced because the thyristor works abnormally.

In addition, the traditional thyristor dimmer driving circuit adopts the way of setting the conductive current or the conduction voltage of the LED assembly, so it is difficult for the traditional thyristor dimmer driving circuit to apply for the various types of thyristors equipped with different holding currents.

BRIEF SUMMARY OF THE INVENTION

In view of this, the technical problem to be solved in the present invention is providing a current control circuit with low power consumption and can be applied to various types of the thyristors so that the flash of the thyristor can be avoided.

The present invention provides a current control circuit for a driving circuit system of a LED assembly, wherein the driving circuit system comprises a current module 202, a rectifier 203, and a thyristor 204, the thyristor 204 is connected in series between an AC power supply and the rectifier 203, the rectifier 203 rectifies an input AC voltage provided by the thyristor and provides a rectified voltage to an anode of the LED assembly 201, and an input terminal of the current module 202 and a cathode of the LED assembly are connected to set a current flowing through the LED assembly, and the current control circuit comprises: a first transistor M1 and a transistor control circuit 205, wherein a drain of the first transistor M1 is connected to the anode of the LED assembly, a gate of the first transistor is connected to a control voltage output terminal of the transistor control circuit 205, the first transistor M1 is turned on or turned off according to a control voltage provided by the control voltage output terminal of the transistor control circuit, and the drain current of the first transistor M1 and the current flowing through the LED assembly determine a feedback voltage VBL for the transistor control circuit; wherein the feedback voltage VBL enables the transistor control circuit to turn on the first transistor and the drain current of the first transistor provides a compensation current for the thyristor when the current flowing through the LED assembly is less than a preset current; wherein the feedback voltage enables the transistor control circuit to turn off the first transistor, when the current flowing through the LED assembly is more than or equal to the preset current; wherein the preset current is set according to the holding current of the thyristor.

In one embodiment of the present invention, the transistor control circuit comprises a first operational amplifier (OP1), a first resistor (RBL), and a second resistor (RCS); wherein a non-inverting input terminal of the first operational amplifier (OP1) receives a first reference voltage (VREF1), an inverting input terminal of the first operational amplifier (OP1) and the drain of the first transistor M1 are connected to receive the feedback voltage VBL, an output terminal of the first operational amplifier (OP1) serves as the control voltage output terminal of the transistor control circuit 2051 and is connected to the gate of the first transistor M1; wherein one terminal of the first resistor (RBL) is connected to a source of the first transistor M1, and the other terminal of the first resistor (RBL) is connected to the ground; wherein one terminal of the second resistor (RCS) is connected to an output terminal of the current module 202, and the other terminal of the second resistor (RCS) is connected to the source of the first transistor M1.

In one embodiment of the present invention, the transistor control circuit comprises a first operational amplifier (OP1), a first resistor (RBL), and a second resistor (RCS); wherein an inverting input terminal of the first operational amplifier (OP1) receives a first reference voltage (VREF1), an output terminal of the first operational amplifier (OP1) serves as the control voltage output terminal 2051 and is connected to the gate of the first transistor M1; wherein one terminal of the second resistor (RCS) is connected to an output terminal of the current module 202, the other terminal of the second resistor (RCS) is connected to a terminal of the first resistor (RBL) and a source of the first transistor M1; wherein the terminal of the first resistor (RBL) is connected to the ground, and the other terminal of the first resistor (RBL) is connected to a non-inverting input terminal of the first operational amplifier (OP1) to provide the feedback voltage VBL.

In one embodiment of the present invention, the transistor control circuit comprises a first operational amplifier (OP1), a first resistor (RBL), and a second resistor (RCS); wherein an inverting input terminal of the first operational amplifier (OP1) receives a first reference voltage REF1, and an output terminal of the first operational amplifier (OP1) serves as the control voltage output terminal 2051 and is connected to the gate of the first transistor M1; wherein one terminal of the second resistor (RCS) is connected to an output terminal of the current module 202 and a source of the first transistor, and the other terminal of the second resistor (RCS) is connected to one terminal of the first transistor (RBL); wherein said terminal of the first resistor (RBL) is connected to the ground, and the other terminal of the first resistor (RBL) is connected to the non-inverting input terminal of the first operational amplifier (OP1) to provide the feedback voltage VBL.

In one embodiment of the present invention, the current module comprises a second operational amplifier (OP2) and a second transistor M2; wherein a non-inverting input terminal of the second operational amplifier (OP2) receives a second reference voltage VREF2, an inverting input terminal of the second operational amplifier (OP2) is connected to a source of the second transistor M2, and an output terminal of the second operational amplifier (OP2) is connected to a gate of the second transistor M2; wherein a drain of the second transistor M2 is connected to an input terminal of the current module 202, and the source of the second transistor M2 is connected to an output terminal of the current module 202.

In one embodiment of the present invention, the first transistor M1 is turned on when the voltage on said terminal VBL of the first resistor (RBL) is less than the first reference voltage (VREF1), and the first transistor M1 is turned off when the voltage on said terminal of the first resistor is more than the first reference voltage.

In one embodiment of the present invention, the first transistor M1 is turned on when the voltage of the other terminal VBL of the first resistor (RBL) is more than the first reference voltage (VREF1), and the first transistor M1 is turned off when the voltage of the other terminal VBL of the first resistor (RBL) is less than the first reference voltage (VREF1).

In one embodiment of the present invention, the current I1 flowing through the first transistor M1 is decreased with the same amount of the increase of the current flowing through the LED assembly when the first transistor is turned on.

In one embodiment of the present invention, the driving circuit system comprises a plurality of LED assemblies and a plurality set of current module arranged to set conductive currents for the plurality of LED assemblies respectively, output terminals of the current modules are connected to a common source output terminal CS.

In one embodiment of the present invention, the preset current is IDS=|VREF1|/RBL, wherein VREF1 is the first reference voltage, and RBL is a resistance of the first resistor.

In one embodiment of the present invention, the current control circuit of the present invention turns on the transistor M1 when the current flowing through the LED assembly is less than the preset current so that the transistor M1 provides the compensation current for the thyristor of the driving circuit system and turns off the transistor M1 when the current flowing through the LED assembly is more than or equal to the preset current so that the transistor M1 does not provide the compensation current for the thyristor of the driving circuit system to reduce the power consumption. The preset current is set based on the different types of holding current of the thyristors. In such a control method, the thyristor maintains on the conductive state in the whole AC period to prevent flash state. The current control system of the present invention can decrease the power consumption because it does not need to set a higher LED assembly conductive current.

The present invention can be more fully understood by reading the subsequent detailed description and examples with references made to the accompanying drawings.

BRIEF DESCRIPTION OF THE DRAWINGS

What are incorporated in and constitute a part of the specification with the description, together illustrates an exemplary embodiment of the present invention, features and aspects, and serve to explain the principles of the invention.

DETAILED DESCRIPTION OF THE INVENTION

The present invention will be discussed in detail in the examples of a variety of methods described. However, it should be noted that many viable concepts provided by the present invention may be implemented in a variety of specific ranges. These specific examples are merely illustrative of the manufacturing and the usage method of the present invention, but they are not intended to limit the scope of the present invention.

Here dedicated word "exemplary" means "serving as an example, embodiments or illustrative." Any implementation described herein as an "exemplary" is not necessarily to be construed as preferred or advantageous over other implementations.

In addition, in order to illustrate the present invention better, numerous specific details are shown as the embodiments below. It should be understood that those skilled in the art can implement the present invention without the specific details. In some instances, the methods, tools, components, and circuits known by people skilled in the art have not been described in detail to highlight the spirit of the invention.

Figure 1:
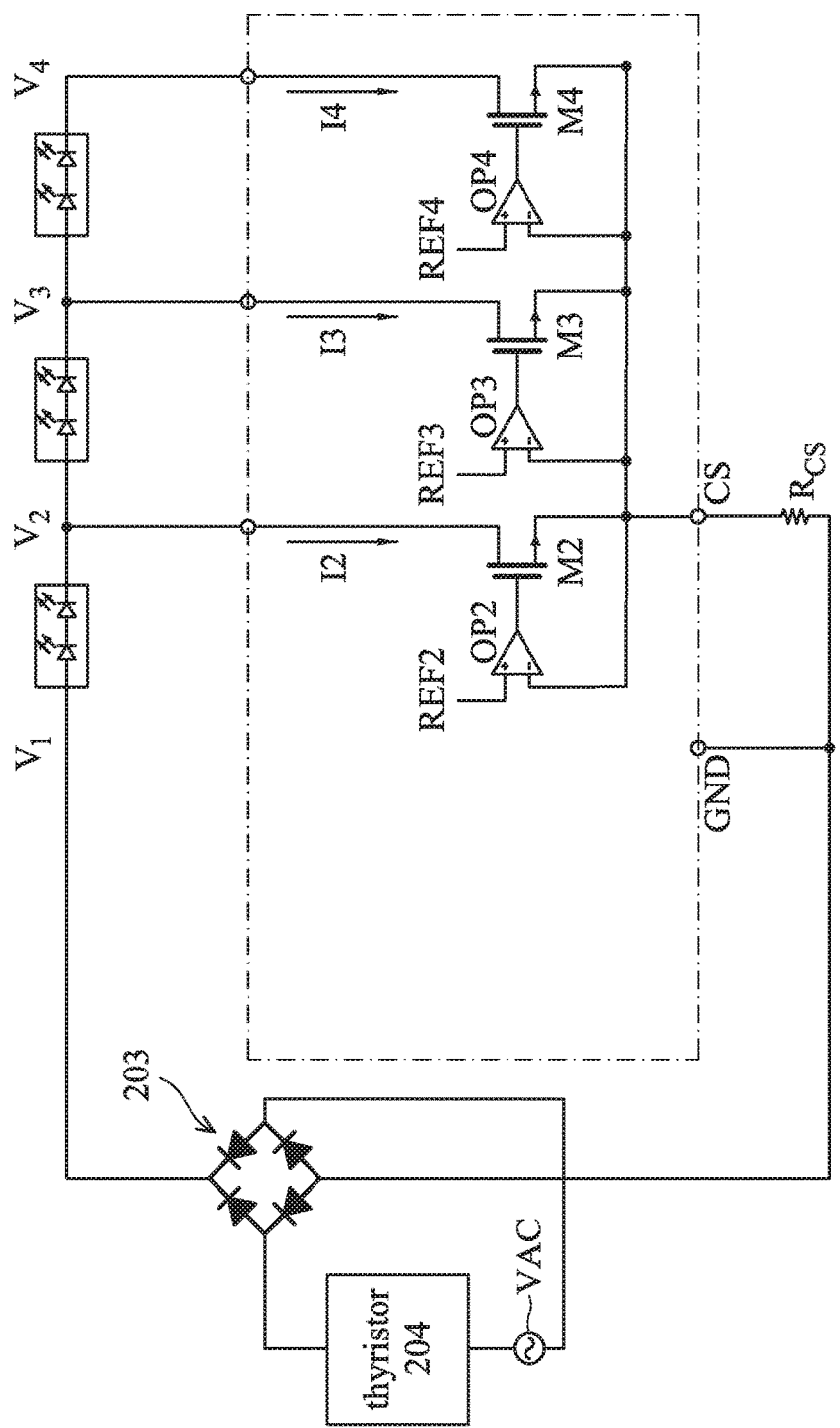
FIG. 1 shows a traditional thyristor dimmer driving circuit.
Figure 2:
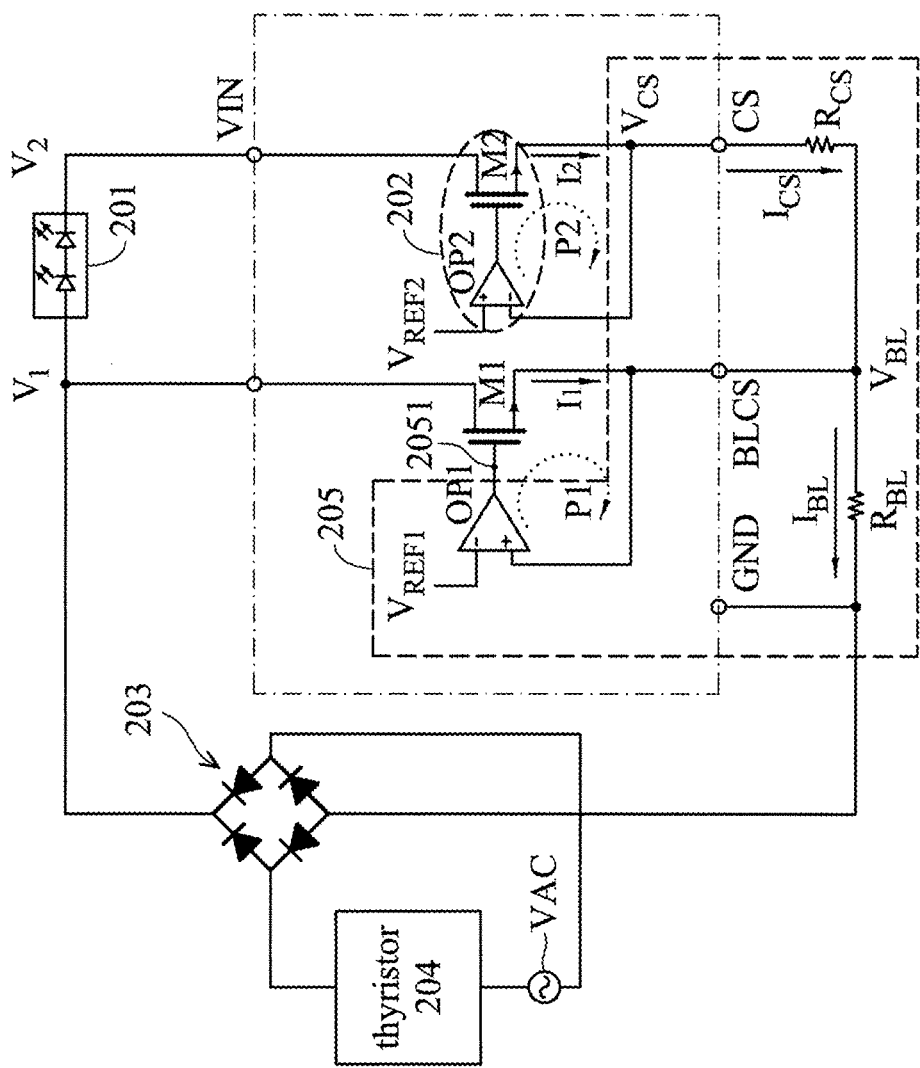
FIG. 2 is a schematic diagram of a current control circuit according to an embodiment of the present invention.

FIG. 2 is a schematic diagram of a current control circuit according to an embodiment of the present invention, and the current control circuit is used in the driving circuit system of the LED assembly.

As shown in FIG. 2, the driving circuit system comprises a current module 202, a rectifier 203, and a thyristor 204. The thyristor 204 is connected in series between an AC power supply and the rectifier 203, the rectifier 203 rectifies an input AC voltage provided by the thyristor 204 and provides the rectified voltage to a cathode of a LED assembly 201, and an input terminal VIN of the current module 202 and a cathode of the LED assembly 201 are connected to set a current I2 flowing through the LED assembly 201.

In one embodiment of the present invention, the current module 202 has a similar structure in FIG. 2. The current module 202 is composed of an operational amplifier OP2 and a transistor M2. A non-inverting input terminal of the operational amplifier OP2 receives a reference voltage VREF2, an inverting input terminal of the operational amplifier OP2 is connected to a source of a transistor M2, and an output terminal of the operational amplifier OP2 is connected to a gate of the transistor M2. A drain of the transistor M2 is connected to the input terminal of the current module 202, and a source of the transistor M2 is connected to the output terminal of the current module 202. For example, the transistor M2 is a MOSFET. As shown in FIG. 2, the transistor M2 is an n-type MOSFET. People skilled in the art should understand that the n-type MOSFET can be substituted by other type of the transistor for the same option in switching. The detailed structure of the current module 202 can be equipped with different designs according to the actual needs, so the above embodiment is only an example and does not limit the scope of the present invention.

In one embodiment of the present invention, as shown in FIG. 2, the current control circuit mainly comprises: a transistor M1 and a transistor control circuit 205. A drain of the transistor M1 is connected to an anode of the LED assembly 201, a gate of the transistor M1 is connected to a control voltage output terminal 2051 of the control circuit 205, the transistor M1 is turned on or off according to a control voltage provided by the control voltage output terminal 2051, and a drain current I1 of the transistor M1 and a current I2 flowing through the LED assembly determine a feedback voltage VBL of the transistor control circuit 205.

When the current I2 flowing through the LED assembly is less than a preset current, the feedback voltage allows the transistor control circuit 205 to turn on the transistor M1 and a drain current of the transistor provides a compensation current for the thyristor.

The feedback voltage allows the transistor control circuit 205 to turn off the transistor M1 when the current I2 flowing through the LED assembly is more than or equal to the preset current. The preset current is set according to a holding current of the thyristor. For example, the preset current is set to be more than the holding current of the thyristor.

In one embodiment of the present invention, as shown in FIG. 2, the current control circuit mainly comprises: an operational amplifier OP1, the resistor RBL, and the resistor RCS. A non-inverting input terminal of the operational amplifier OP1 receives a reference voltage VREF1, an inverting input terminal of the operational amplifier OP1 is connected to the source of the transistor M1, and an output terminal of the operational amplifier OP1 serves as the control voltage output terminal 2051 and is connected to the gate of the transistor M1. A terminal of the resistor RBL is connected to the source of the transistor M1, the other terminal of the resistor RBL is connected to the ground, a terminal of the resistor of the resistor RCS is connected to an output terminal of the current module 202, and the other terminal of the resistor RCS is connected to the source of the transistor M1.

It is noticed that the rectifier of FIG. 2 can be a half-wave rectifier, a full wave rectifier, or a bridge rectifier, but it is not limited to the present invention. In addition, a dashed line with pots of the FIG. 2 is an embodiment of a circuit packaging, internal parts of the dashed line with pots represent the circuit elements integrated on a single chip, and circles VIN, GND, BLCS, CS on the dashed line with pots represent chip pins. People skilled in the art should realize that the circuit packaging in FIG. 2 or shown in the other figures are only examples, and the circuit packaging can be implemented according to real demands. For example, the resistor RBL and the resistor RCS can be integrated with the operational amplifier OP1 in the same chip, so the above embodiment is only an example and it is not limited thereto.

Figure 3A:
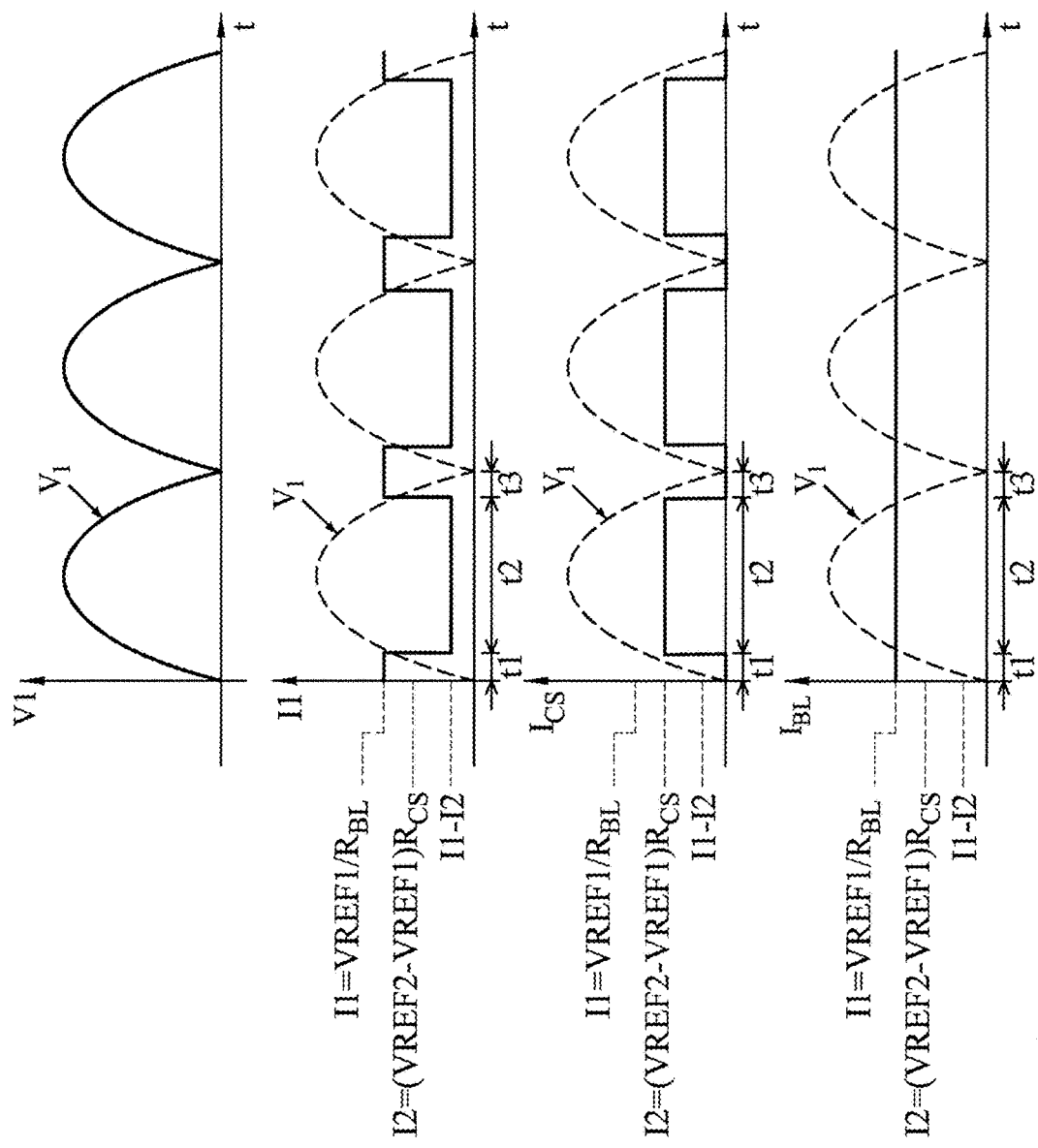
FIG. 3A and FIG. 3B are voltage-current operation timing charts of the current control circuit shown in FIG. 2.
Figure 3B:
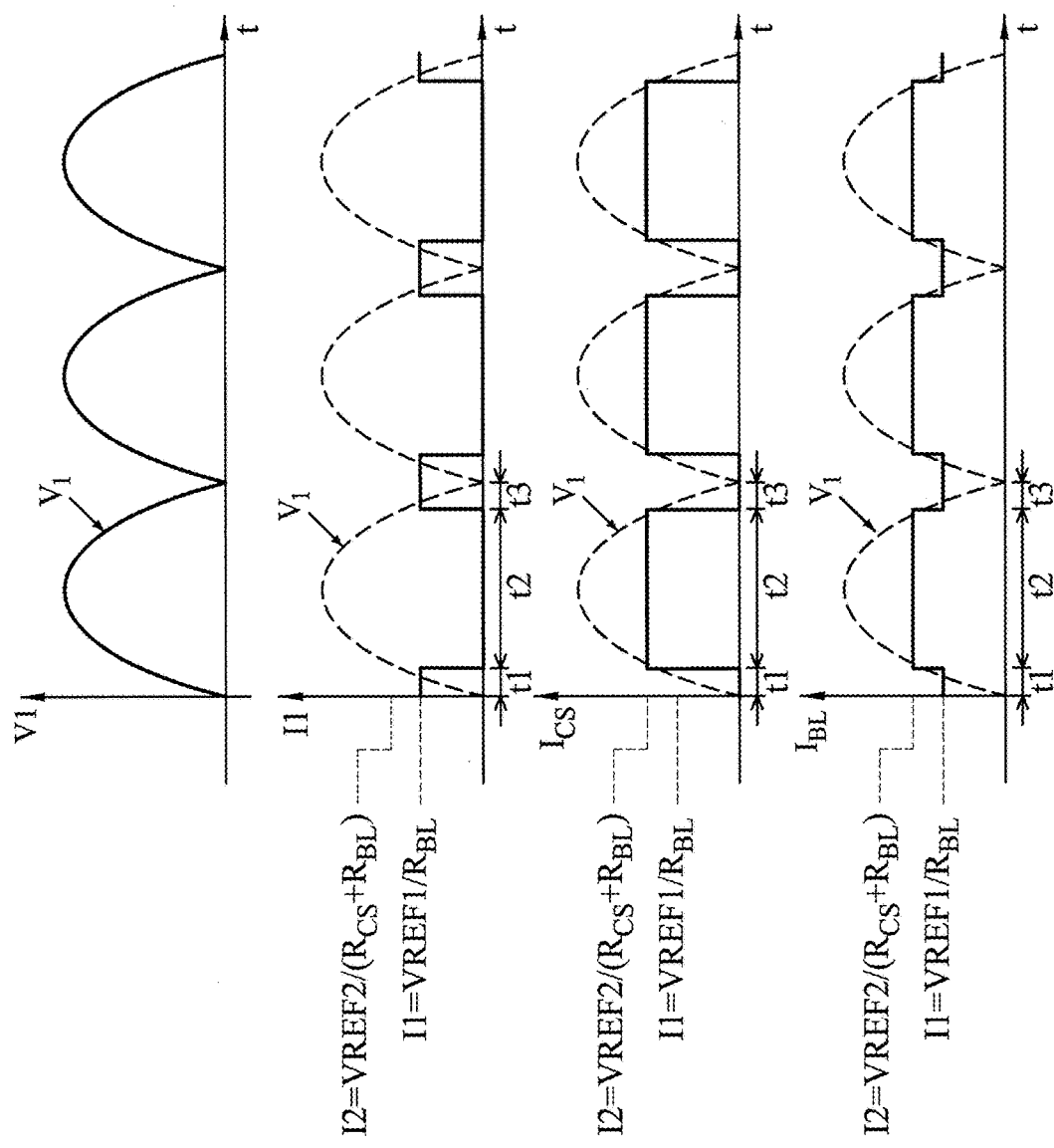

FIG. 3A and FIG. 3B are voltage-current operation timing charts of the current control circuit shown in FIG. 2. Take FIG. 2 for example, FIG. 3A and FIG. 3B are combined to explain the working of the current control circuit of the present invention.

As shown in FIG. 2, the reference voltage VREF1 and the reference voltage VREF2 are set by the system, the relationship of the voltages is VREF2>VREF1>0, and a preset current IDS is determined by the reference voltage VREF1 and the resistance of the resistor RBL.

$$IDS = |VREF1|/RBL \quad (1)$$

The rectifier 203 performs a full-wave rectification for an AC voltage VAC and generates an output voltage V1 when the system is turned on. As shown in FIG. 3A, when the system is turned on (t=0), the output voltage V1 is zero and is not enough for the LED assembly 201 being turned on. At this moment, the current I2 flowing through the LED assembly is zero, the feedback voltage VBL on the pin BLCS is zero, the operational amplifier OP1 outputs a high voltage level (HIGH), the transistor M1 starts to be turned on, a loop P1 is composed of the reference voltage VREF1, the operational amplifier OP1, the transistor M1, and the resistor RBL. When the output voltage V1 further increases but is not enough to turn on the LED assembly (during the time period t1), the drain current I1 of the transistor M1 is increased due to the operational amplifier OP1, and the feedback voltage VBL on the pin BLCS is increased to the reference voltage VREF1 because the LED assembly 201 is not turned on. At this moment, the relationship of the voltage VCS on one terminal of the resistor RCS can be represented as VCS=VBL=VREF1<VREF2 because the LED assembly 201 is not turned on. Even though the transistor M2 is turned on, the current I2 flowing through the LED assembly 201 is zero, and the current ICS flowing through the resistor RCS can be represented as ICS=I2=0. As a result, the current IBL flowing through the resistor RBL (the current flowing through the thyristor) is equal to the drain current I1 of the transistor M1, and the current IBL can be represented as IBL=I1=VREF1/RBL=IDS. As shown in FIG. 3A, the drain current I1 of the transistor M1 provides the compensation current for the thyristor.

As shown in FIG. 3A, due to the increase of the voltage V1 (during the time period t2), the LED assembly 201 is turned on, a loop P2 is composed of the reference voltage VREF2, the operational amplifier OP2, the transistor M2, and the resistor RCS. The current I2 flowing through the LED assembly (the current flowing through the transistor M2, the current flowing through the resistor RCS) is increased due to the operational amplifier OP2. At the same time, the drain current I1 of the transistor M1 is decreased with the reduction of the same amount of current I2 due to the operational amplifier OP1. The current IBL flowing through the resistor RBL is the sum of the drain current I1 of the transistor M1 and the current I2 flowing through the LED assembly 201, wherein the feedback voltage VBL is generated by the current IBL flowing through the resistor RBL. During the time period t2, the current I2 is related to the reference voltage VREF2. If the current I2 flowing through the LED assembly 201 is more than or equal to the preset current IDS during the time period t2, the feedback voltage VBL is more than or equal to the reference voltage VREF1, the operational amplifier OP1 outputs a low voltage level (LOW), the transistor M1 is turned off, and the drain current I1 of the transistor M1 is zero. If the current I2 flowing through the LED assembly 201 is less than the preset current IDS during the time period t2, the feedback voltage VBL follows the reference voltage VREF1, the operational amplifier OP1 still outputs a high voltage level (HIGH), the transistor M1 is still turned on, and the drain current I1 of the transistor M1 still provides the compensation current for the thyristor.

The situations wherein the current I2 flowing through the LED assembly is more than or equal to the preset current IDS and the current I2 flowing through the LED assembly is less than the preset current IDS during the time period t2 are described in the following.

As shown in FIG. 3B, the LED assembly 201 is turned on with the increase of the voltage V1 (during the time period t2) if the current I2 flowing through the LED assembly is more than or equal to the preset current IDS. When the drain current I1 of the transistor M1 is decreased to zero, the feedback voltage VBL on the pin BCLS can be represented as VBL=I2*RBL≥VREF1, and the operational amplifier OP1 outputs a low voltage level (LOW) to turn off the transistor M1. The voltage VCS on a terminal of the resistor RCS at the pin CS follows the reference voltage VREF2, and the current I2 flowing through the LED assembly can be represented as I2=ICS=VREF2/(RCS+RBL). At this moment, the current IBL flowing through the resistor RBL can be represented as IBL=I2=ICS because the drain current I1 is zero. Similarly, when the voltage V1 enters a decreasing period (during the time period t3) and the current I2 flowing through the LED assembly is decreased to be less than the preset current IDS, the transistor M1 is turned on again. The drain current I1 is increased in the same amount with the decrement of the current I2 before the drain current I1 is increased to the current IDS (I1=VREF1/RBL=IDS).

The transistor M1 is still turned on and the drain current I1 of the transistor M1 still provides the compensation current for the thyristor if the current I2 flowing through the LED assembly is less than the preset current IDS during the time period t2. As shown in FIG. 3A, the LED assembly 201 is turned on and the voltage VCS on a terminal of the resistor RCS at the pin CS follows the reference voltage VREF2 with the increase of the voltage V1 (during the time period t2). As a result, the current I2 flowing through the LED assembly can be represented as I2=ICS=(VREF2−VREF1)/RCS, and the current IBL flows through the resistor RBL is the sum of the drain current I1 of the transistor M1 and the current I2 flowing through the LED assembly 201 (IBL=I1+I2). Similarly, the drain current I1 is increased in the same amount with the decrement of the current I2 when the voltage V1 enters the decreasing period (during the time period t3).

Figure 4:
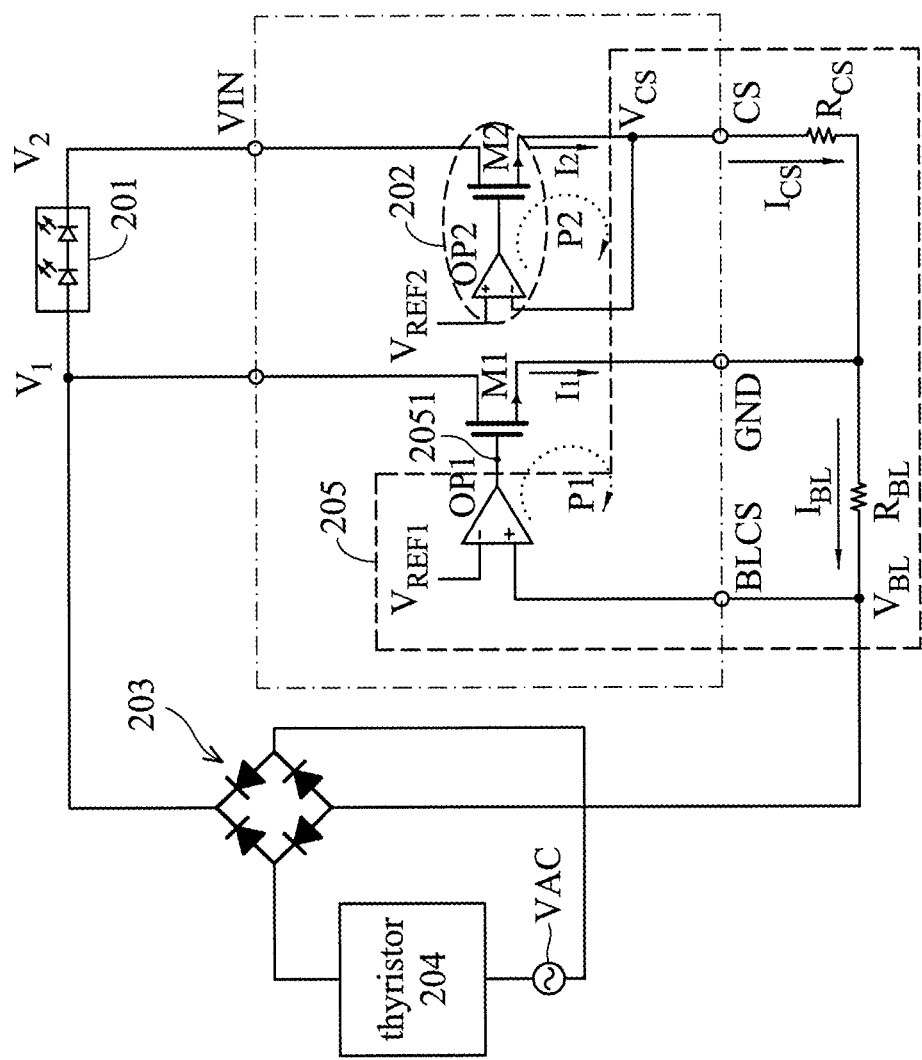
FIG. 4 is a schematic diagram of a current control circuit according to a first modified embodiment of the present invention.

In an embodiment of the present invention, FIG. 4 is a schematic diagram of a current control circuit according to a first modified embodiment of the present invention. Different from the embodiment shown in FIG. 2, an inverting input terminal of the operational amplifier OP1 of the transistor control circuit 205 receives the reference voltage VREF1, one terminal of the resistance RBL is connected to the ground, and the other terminal of the resistance RBL is connected to the non-inverting input terminal of the operational amplifier OP1. The reference voltage VREF1 and the reference voltage VREF2 are set by the system, the relationship of the voltages can be represented as VREF2>0>VREF1. The operational amplifier OP1 outputs a high voltage level (HIGH) and the transistor M1 is turned on, when the feedback voltage VBL of the other terminal of the resistor RBL at pin BCLS is more than the reference voltage VREF1. The transistor M1 is turned off when the feedback voltage VBL of the other terminal of the resistor RBL at pin BCLS is less than or equal to the reference voltage VREF1.

The operational principle of the modified embodiment of FIG. 4 is the same as the operational principle of the embodiment shown in FIG. 2. When the transistor M1 is turned on, the drain current I1 of the transistor M1 is decreased with the same amount of the increase of the current I2 flowing through the LED assembly. The present invention does not repeat the description here for simplicity.

Figure 5:
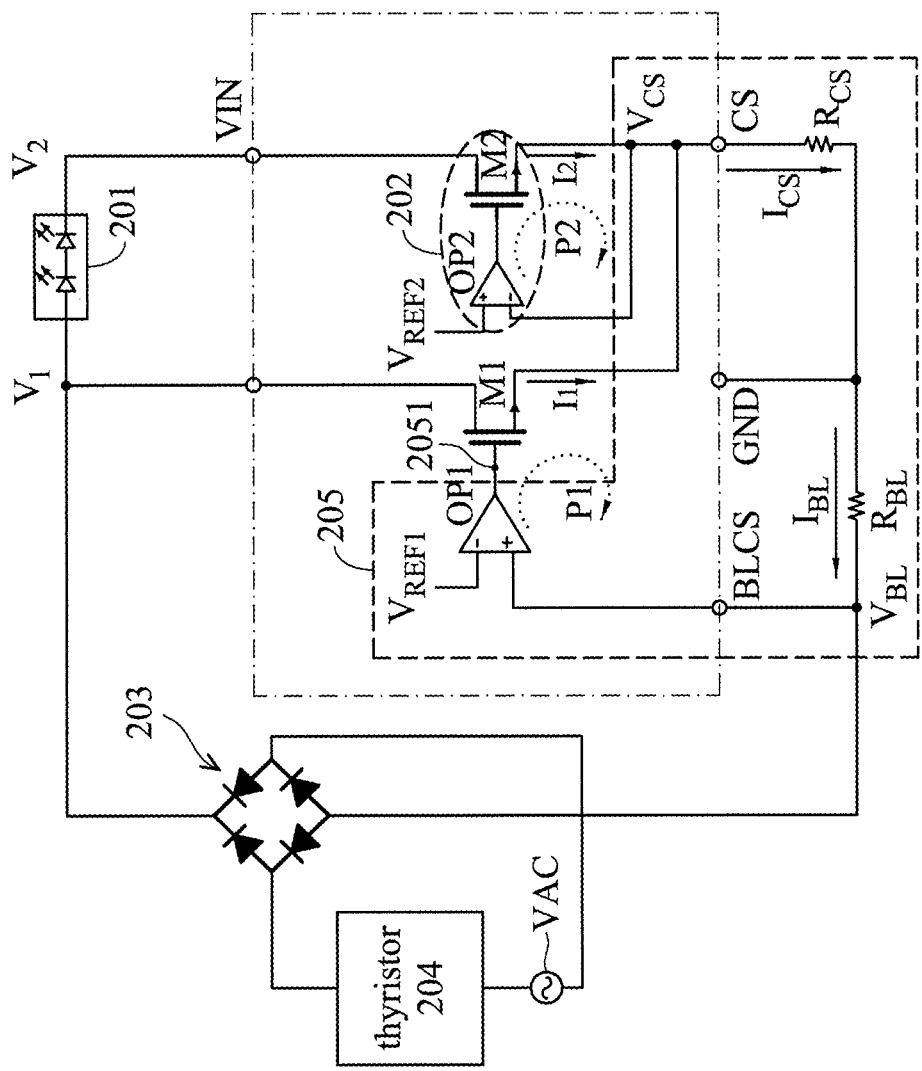
FIG. 5 is a schematic diagram of a current control circuit according to a second modified embodiment of the present invention.

In an embodiment of the present invention, FIG. 5 is a schematic diagram of a current control circuit according to a second modified embodiment of the present invention. Different from the embodiment shown in FIG. 2, an inverting input terminal of the operational amplifier OP1 of the transistor control circuit 205 receives the reference voltage VREF1, one terminal of the resistance RBL is connected to the ground, the other terminal of the resistance RBL is connected to the non-inverting input terminal of the operational amplifier OP1, and the source of the transistor M1 is connected to the pin (common source output terminal) CS. The reference voltage VREF1 and the reference voltage VREF2 are set by the system, the relationship of the voltages can be represented as VREF2>0>VREF1. The operational amplifier OP1 outputs a high voltage level (HIGH) and the transistor M1 is turned on, when the feedback voltage VBL of the other terminal of the resistor RBL at pin BCLS is more than the reference voltage VREF1. The transistor M1 is turned off when the feedback voltage VBL of the other terminal of the resistor RBL at pin BCLS is less than or equal to the reference voltage VREF1.

The operational principle of the modified embodiment of FIG. 5 is the same as the operational principle of the embodiment shown in FIG. 2. When the transistor M1 is turned on, the drain current I1 of the transistor M1 is decreased with the same amount of the increase of the current I2 flowing through the LED assembly. The present invention does not repeat the description here for simplicity.

Figure 6:
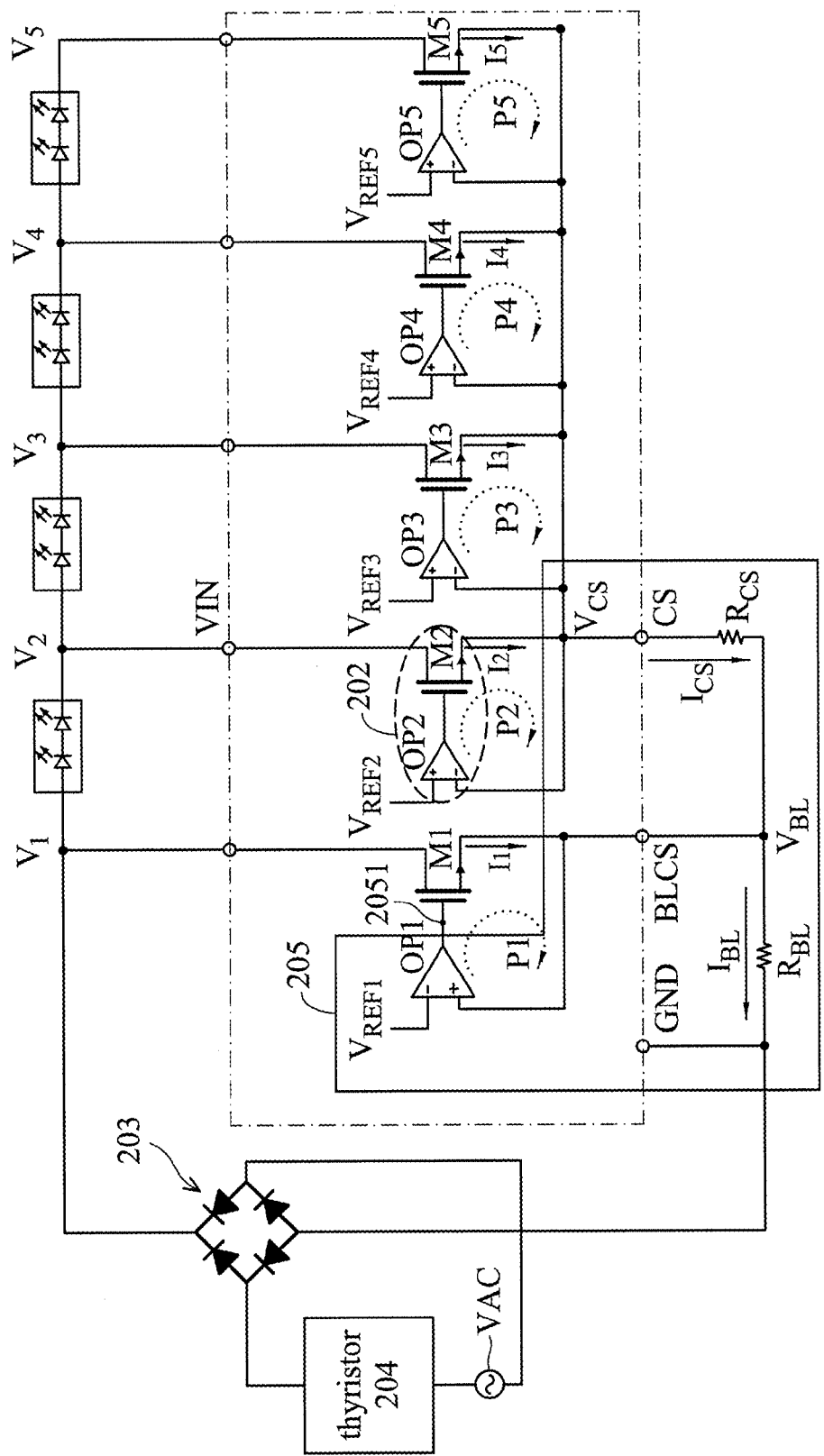
FIG. 6 is a schematic diagram of a current control circuit according to a third modified embodiment of the present invention.

In an embodiment of the present invention, FIG. 6 is a schematic diagram of a current control circuit according to a third modified embodiment of the present invention. Different from the embodiment shown in FIG. 2, the number of the LED assembly in FIG. 2 is one and the number of the current module corresponding to the LED assembly in FIG. 2 is one, respectively. However, the number of the LED assemblies in FIG. 6 is more than one and the number of the current modules corresponding to the LED assembly in FIG.

2 is more than one, respectively (for example: four or an arbitrary number, according to need).

As shown in the modified embodiment in FIG. 6, the reference voltages VREF1, VREF2, VREF3, VREF4, and VREF5 are set by the system, the relationship of the voltage can be represented as VREF5>VREF4>VREF3>VREF2>VREF1>0, and the output terminals of the current modules are connected to the pin (common source output terminal) CS.

When the voltage V1 is small and not enough for turning on a first LED assembly, the transistors M2, M3, M4, and M5 are all turned on. However, no current passes through the transistors M2, M3, M4, and M5 because the voltage V1 is less than a first LED conduction voltage. With the increase of the voltage V1, when the first LED assembly is turned on, the first LED assembly and the transistor M2 form a current path, the current flowing through the resistor RCS is equal to the current I2 flowing through the LED assembly, and the voltage VCS follows the voltage VREF2. With the further increase of the voltage V1, when the second LED conduction voltage is turned on, the first LED assembly, the second LED assembly and the transistor M3 form a current path, and the current flowing through the resistor RCS is equal to the current I3 flowing through the LED assembly. If the current I3 flowing through the LED assembly is more than the current IDS, the voltage VCS on one terminal of the resistor RCS at pin CS is increased with the increase of the current I3. Because the drain current I1 of the transistor M1 is decreased with the same amount of the increase of the current I3, and then the current I3 is increased when the drain current I1 is decreased to zero. At this moment, the feedback voltage VBL on pin BCLS can be represented as VBL=I2*RBL>VREF1. The operational amplifier OP1 outputs a low voltage (LOW) to turn off the transistor M1 due to the operation of the operational amplifier OP1. The voltage VCS follows the reference voltage VREF3, and the transistor M2 is turned off because the relationship of the reference voltages is VREF3>VREF2. When the further increase of the voltage V1 turns on the third LED assembly, the transistor M4, the first LED assembly, the second LED assembly and the third LED assembly form a current path, and the current flowing through the resistor RCS is equal to the current I4 flowing through the LED assembly. The voltage VCS follows the reference voltage VREF4, and the transistor M3 is turned off because the relationship of the reference voltages is VREF4>VREF3. When the further increase of the voltage V1 turns on the fourth LED assembly, the transistor M5, the first LED assembly, the second LED assembly, the third LED and the fourth LED assembly form a current path, and the current flowing through the resistor RCS is equal to the current flowing through the LED assembly. The voltage VCS follows the reference voltage VREF5, and the transistor M4 now is turned off because the relationship of the reference voltages is VREF5>VREF4. The above processes are inverted when the voltage V1 is decreased.

In other words, the embodiment in FIG. 2 shows that the current control circuit is provided by a single-section LED assembly, while the modified embodiment in FIG. 6 shows that the current control circuit is provided by a multiple-section LED assembly (four-section LED assembly). The operational principle of the modified embodiment of the FIG. 6 is the same as the operational principle of the embodiment shown in FIG. 2. The present invention does not repeat the description here for simplicity.

Figure 7A:
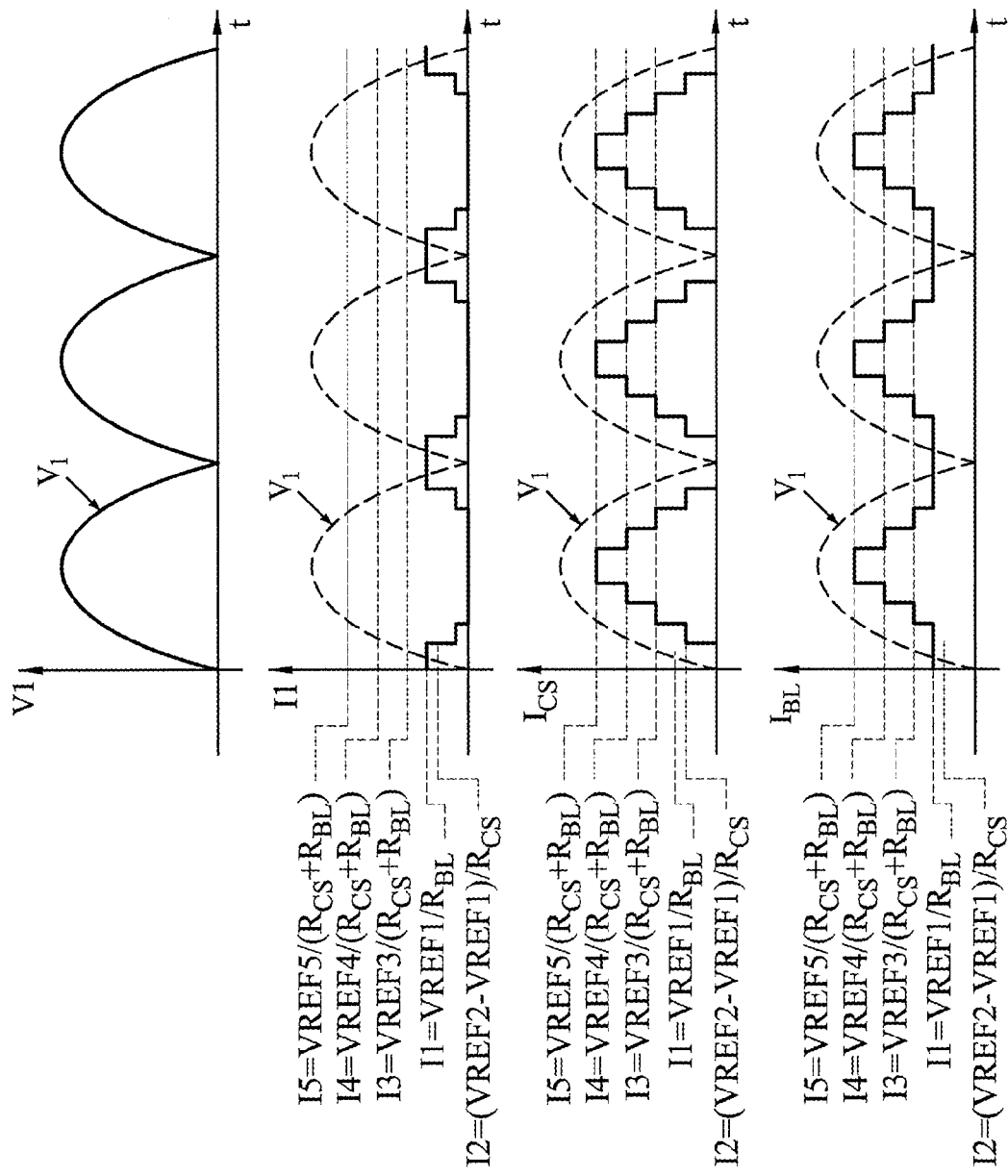
FIG. 7A and FIG. 7B are voltage-current operation timing charts of a current control circuit shown in FIG. 6.
Figure 7B:
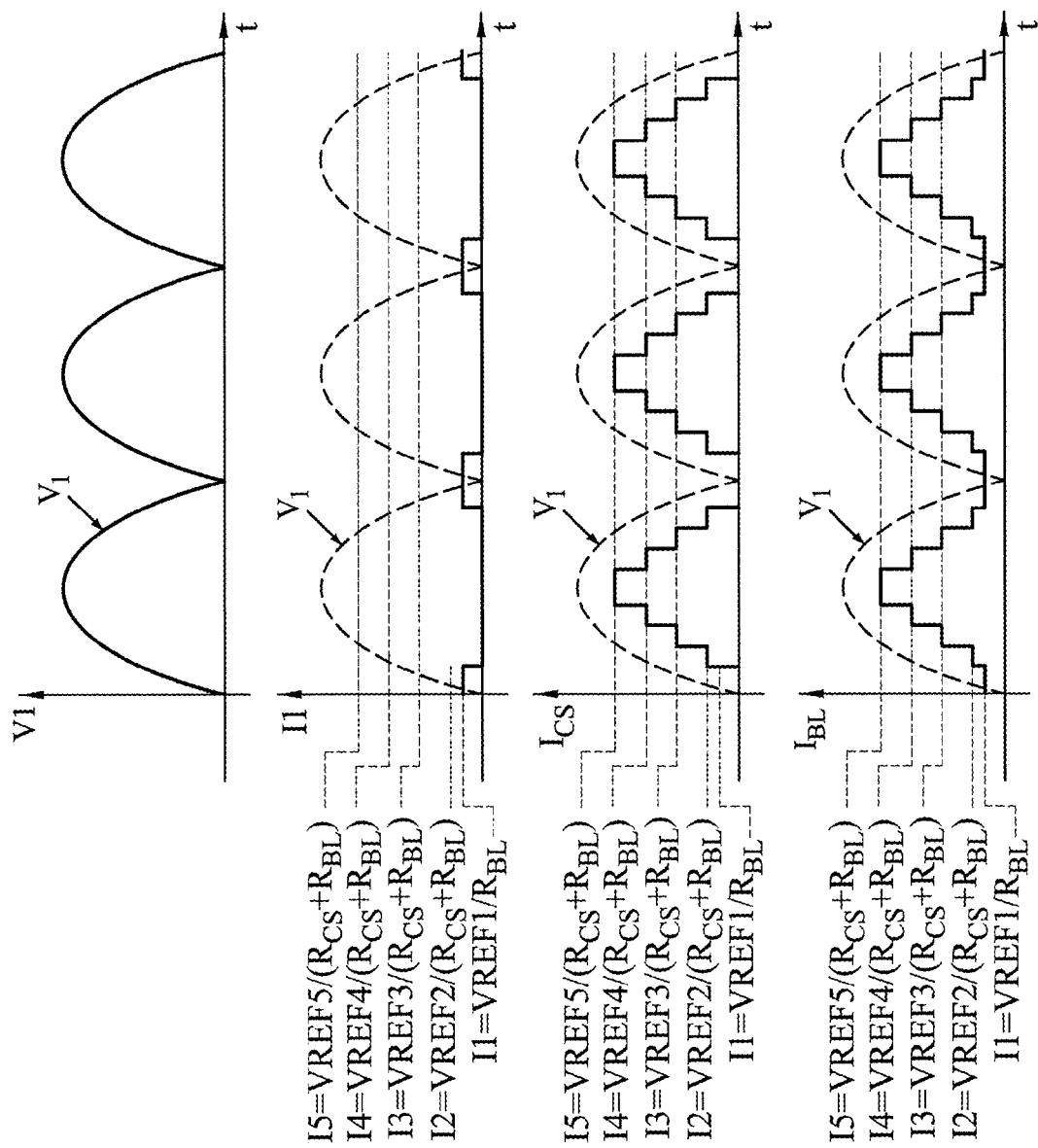

FIG. 7A and FIG. 7B are voltage-current operation timing charts of a current control circuit shown in FIG. 6. The voltage-current operation timing chart of the current control circuit is shown as FIG. 7A if the current I2 flowing through the LED IDS and the current I3 flowing through the LED assembly upon the first LED assembly and the second LED assembly being turned on is more than the preset current IDS. The voltage-current operation timing chart of the current control circuit is shown as FIG. 7B if the current I2 flowing through the LED assembly upon the first LED assembly being turned on is more than the preset current IDS.

FIG. 7A and FIG. 7B are voltage-current operation timing charts of a current control circuit shown in FIG. 6. FIG. 3A and FIG. 3B are voltage-current operation timing charts of a current control circuit shown in FIG. 2. The operational principle of the FIG. 7A and FIG. 7B is the same as the operational principle of the FIG. 3A and FIG. 3B. The present invention does not repeat the description here for simplicity.

Figure 8:
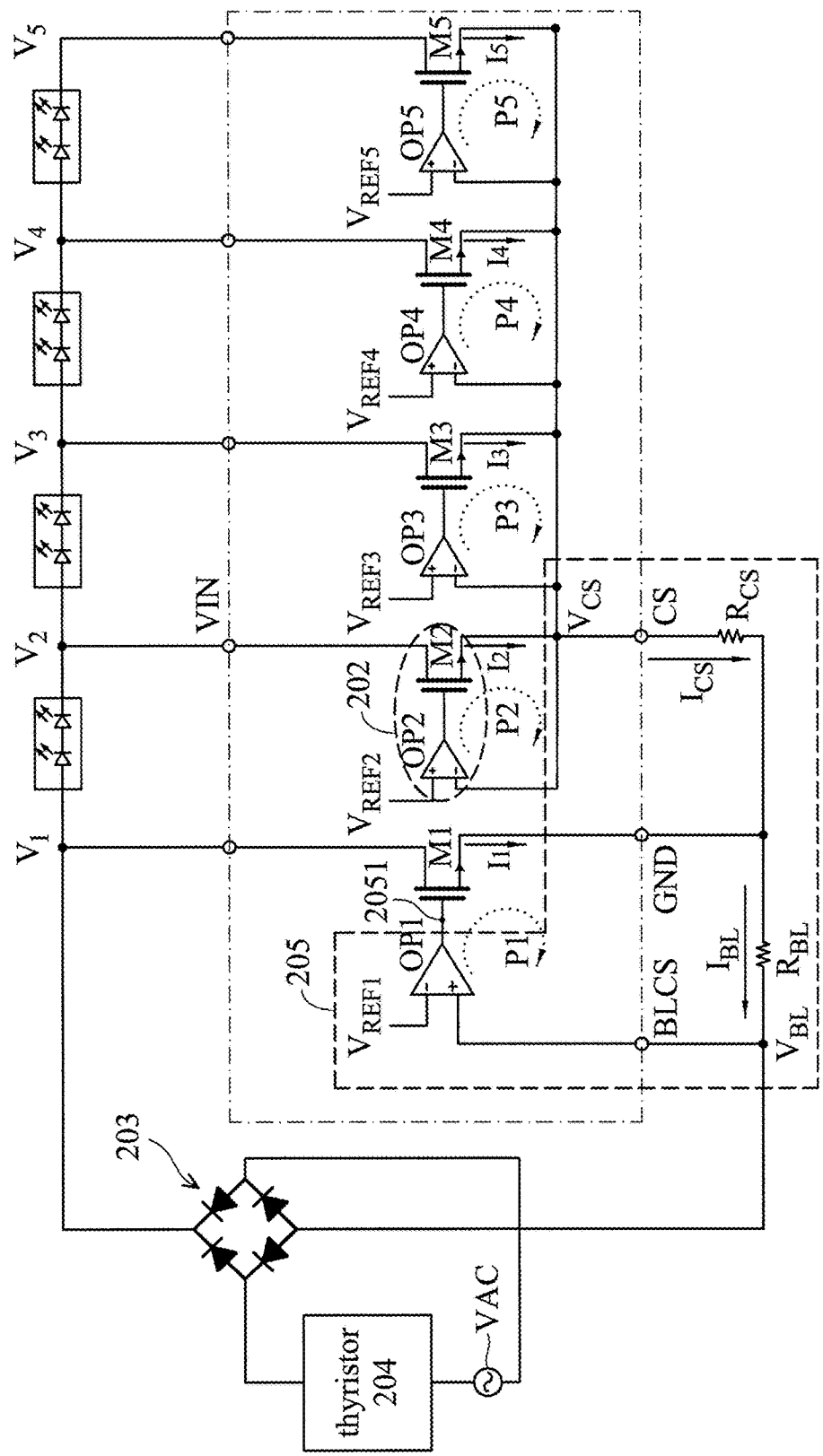
FIG. 8 is a schematic diagram of a current control circuit according to a fourth modified embodiment of the present invention.

FIG. 8 is a schematic diagram of a current control circuit according to a fourth modified embodiment of the present invention. The embodiment in FIG. 4 shows that the current control circuit is provided by a single-section LED assembly, while the modified embodiment in FIG. 8 shows that the current control circuit is provided by a multiple-section LED assembly (four-section LED assembly). The operational principle of the modified embodiment of the FIG. 8 is the same as the operational principle of the embodiment of the FIG. 4 and FIG. 6. The present invention does not repeat the description here for simplicity.

Figure 9:
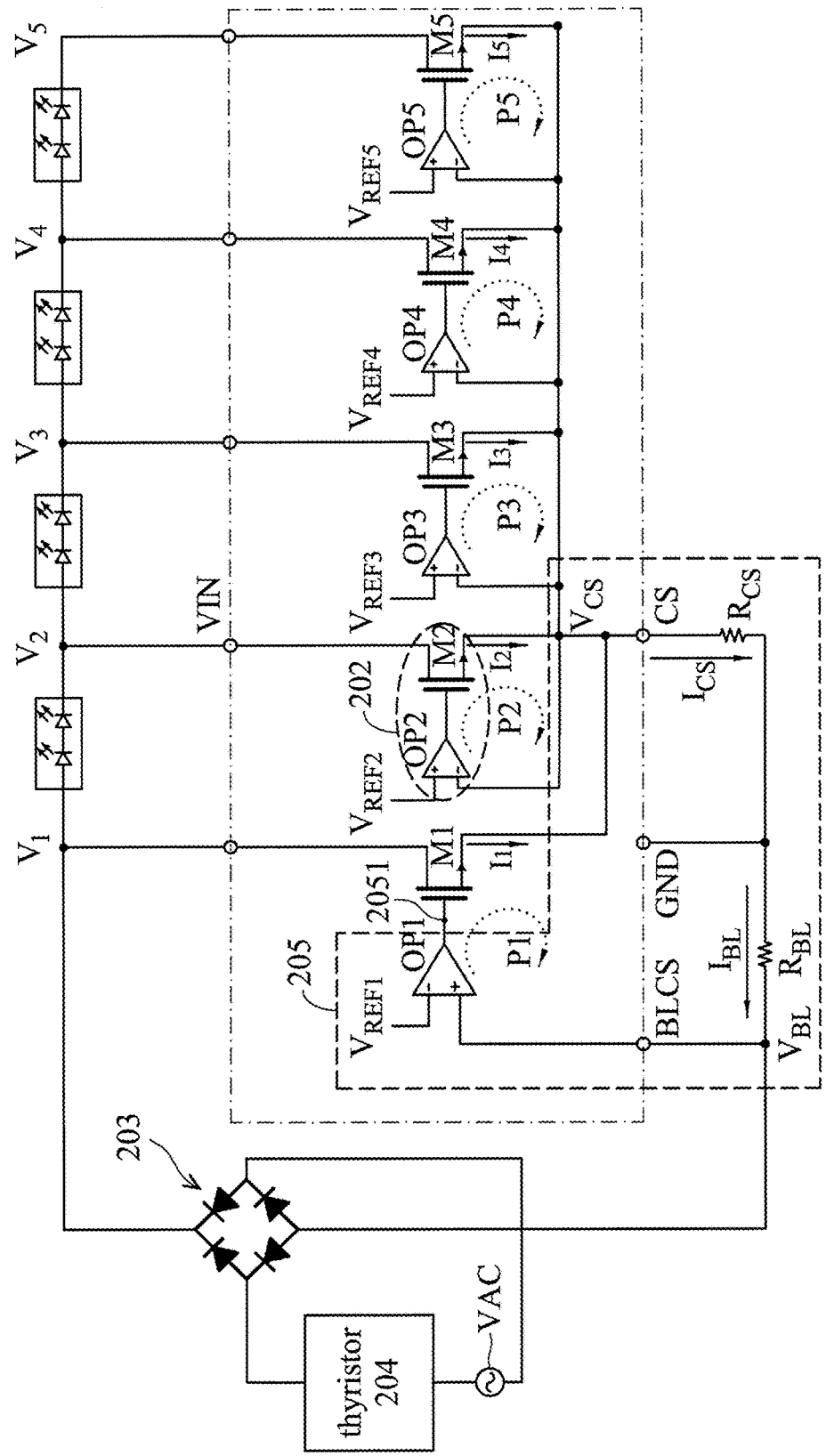
FIG. 9 is a schematic diagram of a current control circuit according to a fifth modified embodiment of the present invention.

FIG. 9 is a schematic diagram of a current control circuit according to a fifth modified embodiment of the present invention. The embodiment in FIG. 5 shows that the current control circuit is provided by a single-section LED assembly, while the modified embodiment in FIG. 9 shows that the current control circuit is provided by a multiple-section LED assembly (four-section LED assembly). The operational principle of the modified embodiment of the FIG. 8 is the same as the operational principle of the embodiment of FIG. 5 and FIG. 6. The present invention does not repeat the description here for simplicity.

Based on the above description, the current control circuit of the present invention turns on the transistor M1 when the current flowing through the LED assembly is less than the preset current so that the transistor M1 provides the compensation current for the thyristor of the driving circuit system and turns off the transistor M1 when the current flowing through the LED assembly is more than or equal to the preset current so that the transistor M1 does not provide the compensation current for the thyristor of the driving circuit system to decrease the power consumption. The preset current is set by the different types of holding current of the thyristors. The thyristor maintains on the conductive state in the whole AC period to prevent flash state. The current control system of the present invention can decrease the power consumption because the current control system of the present invention does not need to set a higher LED assembly conductive current.

Furthermore, the compensation current for the thyristor provided by the current control system of the present invention decreases correspondingly with the increase of the conductive current of the LED assembly when the first LED assembly is turned on (does not produce brightness).

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but are to be accorded the widest scope consistent with the principles and novel features disclosed herein.

What is claimed is:

1. A current control circuit for a driving circuit system of a LED assembly, wherein the driving circuit system comprises a current module, a rectifier, and a thyristor, the thyristor is connected in series between an AC power supply and the rectifier, the rectifier rectifies an input AC voltage provided by the thyristor and provides a rectified voltage to an anode of the LED assembly, and an input terminal of the current module and a cathode of the LED assembly are connected to set a current flowing through the LED assembly, and the current control circuit comprises:

a first transistor and a transistor control circuit, wherein a drain of the first transistor is connected to the anode of the LED assembly, a gate of the first transistor is connected to a control voltage output terminal of the transistor control circuit, the first transistor is turned on or turned off according to a control voltage provided by the control voltage output terminal of the transistor control circuit, and the drain current of the first transistor and the current flowing through the LED assembly determine a feedback voltage for the transistor control circuit;

wherein the feedback voltage enables the transistor control circuit to turn on the first transistor and the drain current of the first transistor provides a compensation current for the thyristor, when the current flowing through the LED assembly is less than a preset current;

wherein the feedback voltage enables the transistor control circuit to turn off the first transistor, when the current flowing through the LED assembly is more than or equal to the preset current;

wherein the preset current is set according to a holding current of the thyristor.

2. The current control circuit as claimed in claim 1, wherein the transistor control circuit comprises a first operational amplifier, a first resistor, and a second resistor;

wherein a non-inverting input terminal of the first operational amplifier receives a first reference voltage, an inverting input terminal of the first operational amplifier and the drain of the first transistor are connected to receive the feedback voltage, an output terminal of the first operational amplifier serves as the control voltage output terminal of the transistor control circuit and is connected to the gate of the first transistor;

wherein one terminal of the first resistor is connected to a source of the first transistor, and the other terminal of the first resistor is connected to the ground;

wherein one terminal of the second resistor is connected to an output terminal of the current module, and the other terminal of the second resistor is connected to the source of the first transistor.

3. The current control circuit as claimed in claim 1, wherein the transistor control circuit further comprises a first operational amplifier, a first resistor, and a second resistor;

wherein an inverting input terminal of the first operational amplifier receives a first reference voltage, an output terminal of the first operational amplifier serves as the control voltage output terminal and is connected to the gate of the first transistor;

wherein one terminal of the second resistor is connected to an output terminal of the current module, the other terminal of the second resistor is connected to a terminal of the first resistor and a source of the first transistor;

wherein the terminal of the first resistor is connected to the ground, and the other terminal of the first resistor is connected to a non-inverting input terminal of the first operational amplifier to provide the feedback voltage.

4. The current control circuit as claimed in claim 1, wherein the transistor control circuit further comprises a first operational amplifier, a first resistor, and a second resistor;

wherein an inverting input terminal of the first operational amplifier receives a first reference voltage, and an output terminal of the first operational amplifier serves as the control voltage output terminal and is connected to the gate of the first transistor;

wherein one terminal of the second resistor is connected to an output terminal of the current module and a source of the first transistor, and the other terminal of the second resistor is connected to one terminal of the first transistor;

wherein said terminal of the first resistor is connected to the ground, and the other terminal of the first resistor is connected to the non-inverting input terminal of the first operational amplifier to provide the feedback voltage.

5. The current control circuit as claimed in claim 1, wherein the current module further comprises a second operational amplifier and a second transistor;

wherein a non-inverting input terminal of the second operational amplifier receives a second reference voltage, an inverting input terminal of the second operational amplifier is connected to a source of the second transistor, and an output terminal of the second operational amplifier is connected to a gate of the second transistor;

wherein a drain of the second transistor is connected to an input terminal of the current module, and the source of the second transistor is connected to an output terminal of the current module.

6. The current control circuit as claimed in claim 2, wherein the first transistor is turned on when a voltage on said terminal of the first resistor is less than the first reference voltage, and the first transistor is turned off when the voltage on said terminal of the first resistor is more than the first reference voltage.

7. The current control circuit as claimed in claim 3, wherein the first transistor is turned on when a voltage of the other terminal of the first resistor is more than the first reference voltage, and the first transistor is turned off when the voltage of the other terminal of the first resistor is less than the first reference voltage.

8. The current control circuit as claimed in claim 4, wherein the first transistor is turned on when a voltage of the other terminal of the first resistor is more than the first reference voltage, and the first transistor is turned off when the voltage of the other terminal of the first resistor is less than the first reference voltage.

9. The current control circuit as claimed in claim 8, wherein the current flowing through the first transistor is decreased with the same amount of the increase of the current flowing through the LED assembly when the first transistor is turned on.

10. The current control circuit as claimed in claim 8, wherein the driving circuit system comprises a plurality of LED assemblies and a plurality set of current module arranged to set conductive currents for the plurality of LED assemblies respectively, output terminals of the current modules are connected to a common source output terminal.

11. The current control circuit as claimed in claim 2, wherein the preset current is IDS=|VREF1|/RBL, wherein VREF1 is the first reference voltage, and RBL is a resistance of the first resistor.

\* \* \* \* \*